United States Patent
van Zon

(12) 
(10) Patent No.: US 7,016,412 B1
(45) Date of Patent: Mar. 21, 2006

(54) SYSTEM AND METHOD FOR DYNAMIC ADAPTIVE DECODING OF SCALABLE VIDEO TO BALANCE CPU LOAD

(75) Inventor: Cornelis van Zon, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 955 days.

(21) Appl. No.: 09/650,200

(22) Filed: Aug. 29, 2000

(51) Int. Cl.
*H04B 1/66* (2006.01)

(52) U.S. Cl. .............................. 375/240.1; 375/240.15

(58) Field of Classification Search . 375/240.1–240.21
See application file for complete search history.

(56) References Cited

U.S. PATENT DOCUMENTS

| | | | |
|---|---|---|---|
| 5,758,028 A | 5/1998 | Kaan et al. | 395/51 |
| 5,825,102 A | 10/1998 | Babiel et al. | 327/127 |
| 5,925,104 A | 7/1999 | Elbers et al. | 709/231 |
| 6,014,694 A * | 1/2000 | Aharoni et al. | 709/219 |
| 6,292,512 B1 * | 9/2001 | Radha et al. | 375/240.1 |
| 6,434,196 B1 * | 8/2002 | Sethuraman et al. | 375/240.12 |

FOREIGN PATENT DOCUMENTS

| | | |
|---|---|---|
| EP | 0329151 A2 | 8/1989 |
| EP | 0329151 A3 | 8/1989 |
| EP | 0762275 A2 | 3/1997 |
| EP | 0762275 A3 | 3/1997 |
| EP | 0927932 A2 | 7/1999 |
| EP | 0927932 A3 | 7/1999 |
| EP | 0690376 B1 | 11/1999 |
| EP | 0703533 B1 | 11/1999 |
| EP | 0690377 B1 | 12/1999 |
| GB | 2320113 A | 6/1998 |
| WO | WO9912126 | 4/1998 |

* cited by examiner

*Primary Examiner*—Andy Rao

(57) ABSTRACT

There is disclosed an apparatus for controlling the processing load of a scalable video decoder that decodes an incoming scalable video bit stream and generates a baseband video signal. The apparatus comprises: 1) an analyzer circuit for measuring at least one characteristic of the incoming scalable video bit stream and generating at least one video parameter associated with the at least one characteristic; and 2) a processor load controller for receiving the at least one video parameter and, in response thereto, controlling a level of decoding of the incoming scalable video bit stream performed by the scalable video decoder.

21 Claims, 5 Drawing Sheets

SYSTEM AND METHOD FOR DYNAMIC ADAPTIVE DECODING OF SCALABLE VIDEO TO BALANCE CPU LOAD

TECHNICAL FIELD OF THE INVENTION

The present invention is directed, in general, to video decoders and, more specifically, to a video decoder that dynamically adapts the workload of a central processing unit (CPU) that decodes a scalable video data stream.

BACKGROUND OF THE INVENTION

Real-time streaming of multimedia content over data networks, including the Internet, has become an increasingly common application in recent years. A wide range of interactive and non-interactive multimedia applications, such as news-on-demand, live network television viewing, video conferencing, among others, rely on end-to-end streaming video techniques. Unlike a "downloaded" video file, which may be retrieved first in "non-real" time and viewed or played back later in "real" time, streaming video applications require a video transmitter that encodes and transmits a video signal over a data network to a video receiver, which must decode and display the video signal in real time.

Scalable video coding is a desirable feature for many multimedia applications and services that are used in systems employing decoders with a wide range of processing power. Scalability allows processors with low computational power to decode only a subset of the scalable video stream. Another use of scalable video is in environments with a variable transmission bandwidth. In those environments, receivers with low-access bandwidth receive, and consequently decode, only a subset of the scalable video stream, where the amount of that subset is proportional to the available bandwidth.

Several video scalability approaches have been adopted by lead video compression standards, such as MPEG-2 and MPEG-4. Temporal, spatial and quality (e.g., signal-noise ratio (SNR)) scalability types have been defined in these standards. All of these approaches consist of a base layer (BL) and an enhancement layer (EL). The base layer part of the scalable video stream represents, in general, the minimum amount of data needed for decoding that stream. The enhanced layer part of the stream represents additional information, and therefore enhances the video signal representation when decoded by the receiver.

For example, in a variable bandwidth system, such as the Internet, the base layer transmission rate may be established at the minimum guaranteed transmission rate of the variable bandwidth system. Hence, if a subscriber has a minimum guaranteed bandwidth of 256 kbps, the base layer rate may be established at 256 kbps also. If the actual available bandwidth is 384 kbps, the extra 128 kbps of bandwidth may be used by the enhancement layer to improve on the basic signal transmitted at the base layer rate.

For each type of video scalability, a certain scalability structure is identified. The scalability structure defines the relationship among the pictures of the base layer and the pictures of the enhanced layer. One class of scalability is fine-granular scalability. Images coded with this type of scalability can be decoded progressively. In other words, the decoder may decode and display the image with only a subset of the data used for coding that image. As more data is received, the quality of the decoded image is progressively enhanced until the complete information is received, decoded, and displayed.

The proposed MPEG-4 standard is directed to video streaming applications based on very low bit rate coding, such as video-phone, mobile multimedia/audio-visual communications, multimedia e-mail, remote sensing, interactive games, and the like. Within the MPEG-4 standard, fine-granular scalability (FGS) has been recognized as an essential technique for networked video distribution. FGS primarily targets applications where video is streamed over heterogeneous networks in real-time. It provides bandwidth adaptivity by encoding content once for a range of bit rates, and enabling the video transmission server to change the transmission rate dynamically without in-depth knowledge or parsing of the video bit stream.

During the decoding of scalable video, such as MPEG 2 or MPEG 4 video, the activity of the central processing unit (CPU) that decodes the video bit stream can vary widely over time. The CPU load varies because the decompression process depends on source type (video or film), video content (level of motion, level of detail), and frame type (I, B, P). A film source generally requires a greater amount of processing power than an original video source due to the larger size and greater aspect ratio of film. An I-frame (or image frame), which contains the entire bit image of a single frame of video, generally requires the greatest amount of processing power. A P-frame (or predicted frame), which contains the differences between the current frame and the next frame, generally requires the least amount of processing power. A B-frame (or bidirectional frame), which tracks all of the changes since the previous I frame, generally requires greater processing power than a P-frame but less than an I-frame.

If a single CPU is executing a software scalable video decoder, such a software MPEG decoder, in real time concurrently with other programs, such as a digital signal processing application, then the wide variations in CPU load caused by the video decoding operation can detrimentally impact the performance of the CPU. The set of concurrent programs executed by the CPU must be time-multiplexed while meeting the real-time requirements of the scalable video decoding operation. The scheduling of the individual programs (or tasks) is generally under the control of a real-time operating system. However, task scheduling becomes a very complex operation when the CPU load (i.e., CPU cycles, memory bandwidth, and the like) of the tasks varies significantly with time. Task scheduling typically reserves for each task the CPU resources necessary for the peak requirements of each task. This leads to inefficiencies when one of the tasks is a video decoding operation, because of the large differences between the peak requirements and the average requirements of the video decoding operation. This difference is simply wasted during periods ore relatively low CPU activity.

Therefore, there is a need in the art for improved decoders and decoding techniques for use in streaming video systems. In particular, there is a need for systems and methods for balancing the load on a central processing unit during the decoding of a scalable video signal. More particularly, there is a need for systems and methods capable of dynamically adjusting or varying the level of decoding of a scalable video signal, such as a scalable MPEG signal, in order to reduce the variations in the CPU load.

SUMMARY OF THE INVENTION

To address the above-discussed deficiencies of the prior art, it is a primary object of the present invention to provide, for use with a scalable video decoder capable of decoding an incoming scalable video bit stream and generating a baseband video signal, an apparatus for controlling a processing load of the scalable video decoder. According to an advantageous embodiment of the present invention, the apparatus comprises: 1) an analyzer circuit capable of measuring at least one characteristic of the incoming scalable video bit stream and generating at least one video parameter associated with the at least one characteristic; and 2) a processor load controller capable of receiving the at least one video parameter and, in response thereto, controlling a level of decoding of the incoming scalable video bit stream performed by the scalable video decoder.

According to one embodiment of the present invention, the at least one video parameter indicates a level of motion of frames in the incoming scalable video bit stream.

According to another embodiment of the present invention, the at least one video parameter indicates a level of detail of frames in the incoming scalable video bit stream.

According to still another embodiment of the present invention, the processor load controller is further capable of receiving a frame type parameter associated with a first frame in the incoming scalable video bit stream.

According to yet another embodiment of the present invention, the frame type parameter comprises at least one of an I-frame parameter, a B-frame parameter, and a P-frame parameter.

According to a further embodiment of the present invention, the processor load controller is further capable of receiving a source type parameter associated with the first frame in the incoming scalable video bit stream.

According to a still further embodiment of the present invention, the source type parameter indicates whether the incoming scalable video bit stream is one of a video bit stream and a film bit stream.

According to a yet further embodiment of the present invention, the processor load controller generates at least one scale factor capable of controlling a level of decoding performed by the scalable video decoder.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged scalable MPEG video decoder.

Figure 1:
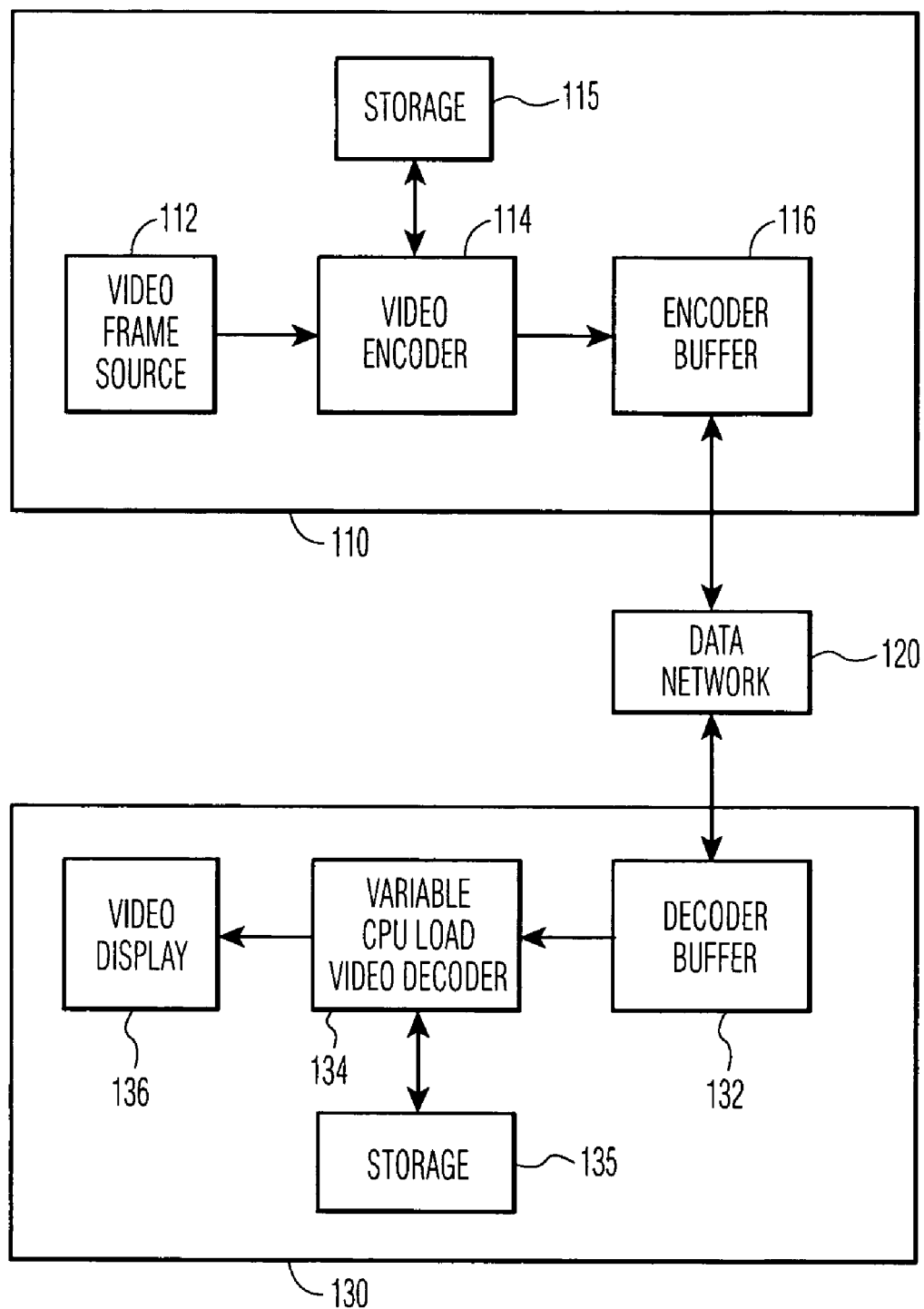
FIG. 1 illustrates an end-to-end transmission of streaming video from a streaming video transmitter through a data network to a streaming video receiver according to one embodiment of the present invention.

FIG. 1 illustrates an end-to-end transmission of streaming video from streaming video transmitter 110 through data network 120 to streaming video receiver 130, according to one embodiment of the present invention. Depending on the application, streaming video transmitter 110 may be any one of a wide variety of sources of video frames, including a data network server, a television station transmitter, a cable network, a desktop personal computer (PC), or the like.

Streaming video transmitter 110 comprises video frame source 112, video encoder 114, storage 115, and encoder buffer 116. Video frame source 112 may be any device capable of generating a sequence of uncompressed video frames, including a television antenna and receiver unit, a video cassette player, a video camera, a disk storage device capable of storing a "raw" video clip, and the like. The uncompressed video frames enter video encoder 114 at a given picture rate (or "streaming rate") and are compressed according to any known compression algorithm or device, such as an MPEG-2 or MPEG-4 encoder. Video encoder 114 then transmits the compressed video frames to encoder buffer 116 for buffering in preparation for transmission across data network 120.

Data network 120 may be any suitable network and may include portions of both public data networks, such as the Internet, and private data networks, such as an enterprise-owned local area network (LAN) or wide area network (WAN). For television broadcast applications and wireless LANs, data network 120 represents the wireless transmission channels through which the encoded data is transmitted. In such applications, encoder buffer 116 may further comprise radio frequency (RF) transceiver circuitry capable of up-converting the baseband compressed video signal to an RF signal.

Streaming video receiver 130 comprises decoder buffer 132, variable CPU load video decoder 134, storage 135, and video display 136. Depending on the application, streaming video receiver may be any one of a wide variety of receivers of video frames, including a television receiver, a desktop personal computer (PC), a video cassette recorder (VCR), or the like. Decoder buffer 132 receives and stores streaming compressed video frames from data network 120. In wireless applications, such as television and wireless LANs, decoder buffer 132 may further comprise radio frequency (RF) transceiver circuitry capable of down-converting the RF signal received from the wireless transmission channel (i.e., data network 120) to a baseband compressed video signal, which is then stored in decoder buffer 132.

Decoder buffer 132 then transmits the compressed video frames to variable CPU load video decoder 134 as required. Variable CPU load video decoder 134 decompresses the video frames at the same rate (ideally) at which the video frames were compressed by video encoder 114. Variable CPU load video decoder 134 sends the decompressed frames to video display 136 for play-back on the screen of video display 134.

In an advantageous embodiment of the present invention, video encoder 114 may be implemented as a software program executed by a conventional data processor, such as a standard MPEG encoder. In such an implementation, video encoder 114 may comprise a plurality of computer executable instructions stored in storage 115. Storage 115 may comprise any type of computer storage medium, including a fixed magnetic disk, a removable magnetic disk, a CD-ROM, magnetic tape, video disk, and the like. Furthermore, in an advantageous embodiment of the present invention, variable CPU load video decoder 134 also may be implemented as a software program executed by a conventional data processor, such as a standard MPEG decoder. In such an implementation, variable CPU load video decoder 134 may comprise a plurality of computer executable instructions stored in storage 135. Storage 135 also may comprise any type of computer storage medium, including a fixed magnetic disk, a removable magnetic disk, a CD-ROM, magnetic tape, video disk, and the like.

Figure 2:
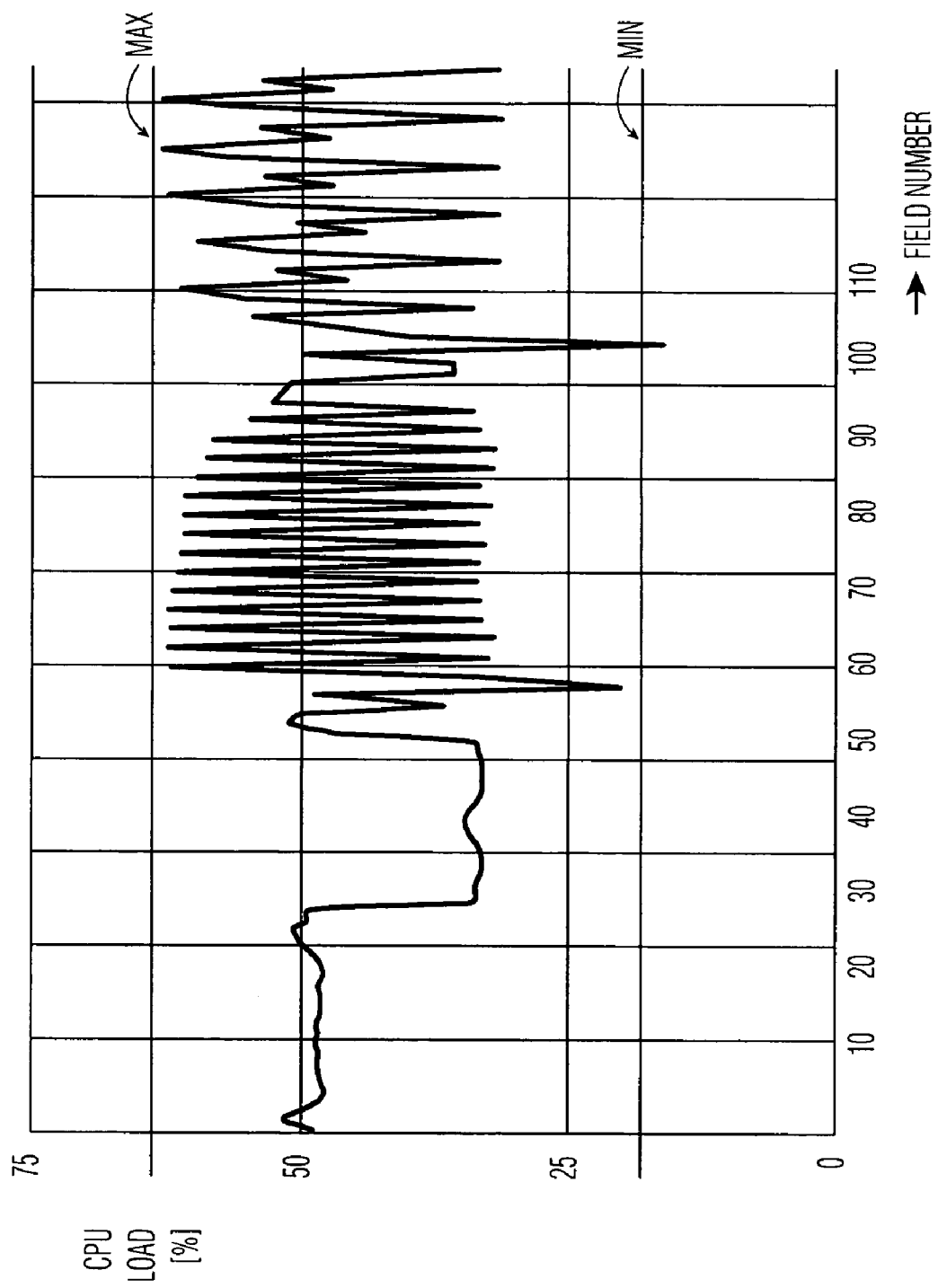
FIG. 2 is a time domain representation of the load on a central processing unit decoding a video signal in a conventional streaming video receiver according to the prior art.

FIG. 2 is a time domain representation of the load on a central processing unit decoding a video signal in a conventional streaming video receiver according to the prior art. As FIG. 2 shows, the video decoding of each field of the video signal consumes between a minimum (min) level of about 20% of the CPU time and a maximum (max) level of about 65% of the CPU time. As noted above, in a single CPU system executing a video decoder program concurrently with other programs, these wide variations in CPU load may detrimentally impact the performance of the CPU. The task scheduling must reserve for the video decoder program about 65% of the CPU resources to meet the peak requirements of the video decoding operations. However, the video decoding program only uses all 65% of the allocated resources for relatively brief periods of time.

The present invention increases the performance of the CPU by dynamically adjusting the amount of processing power allocated to the video decoding application. To accomplish this, a dynamically adjustable video decoder according of the principles of the present invention allows graceful degradation of the video image during peak CPU load periods. This creates a trade-off between CPU resource requirements and output image quality.

Figure 3:
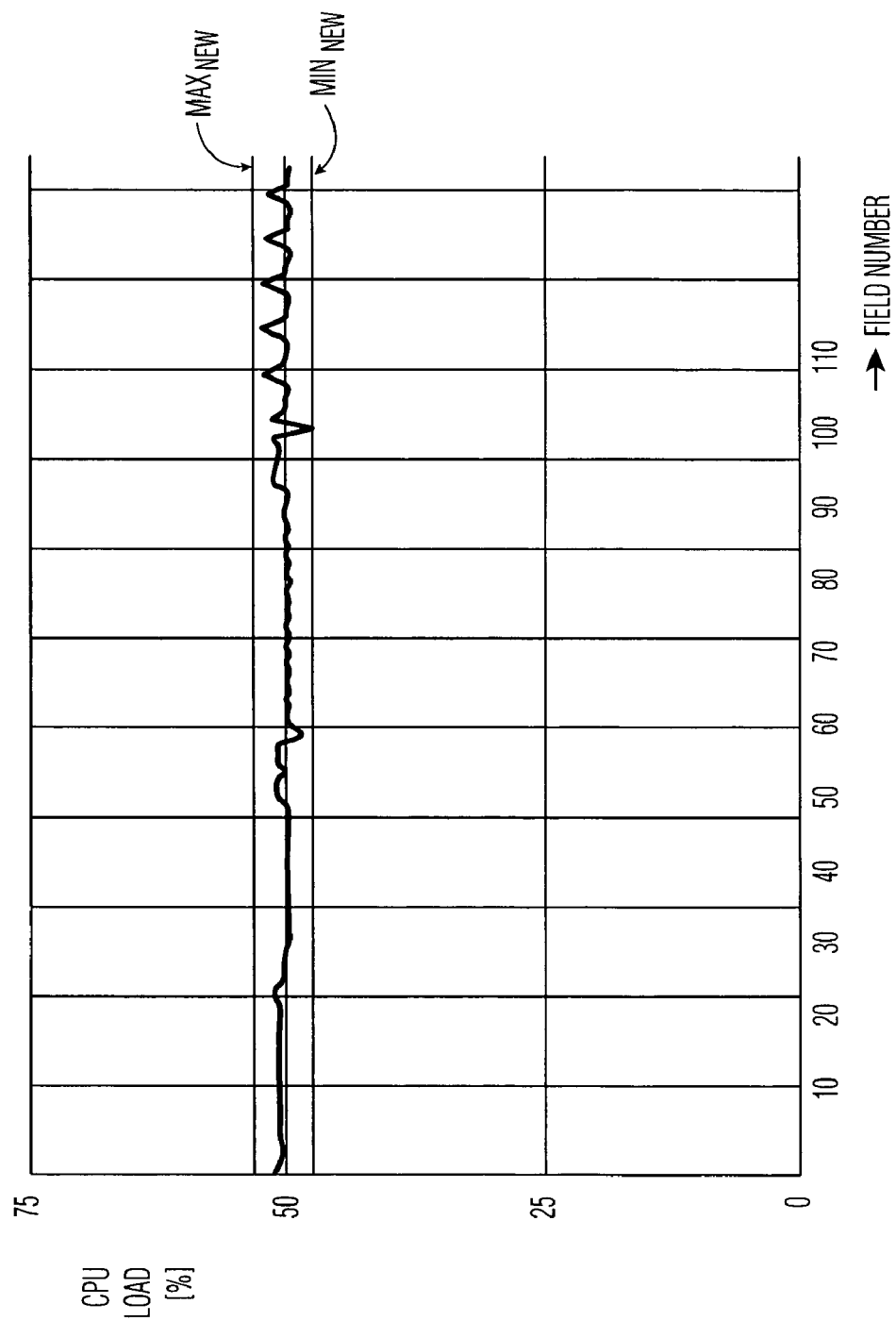
FIG. 3 is a time domain representation of the load on a central processing unit decoding a video signal in the streaming video receiver in FIG. 1 according to one embodiment of the present invention.

FIG. 3 is a time domain representation of the load on a central processing unit decoding a video signal in the streaming video receiver in FIG. 1 according to one embodiment of the present invention. As FIG. 3 shows, the video decoding of each field of the video signal is controlled in such a way that the CPU load is approximately constant over time. Thus, the quantity ($max_{new} - min_{new}$) in FIG. 3 is much less than the corresponding quantity (max−mum) in FIG. 2. Additionally, the new average CPU load ($max_{new} - mum_{new}$)/2 is lower than the original peak load (i.e., max in FIG. 2).

Figure 4:
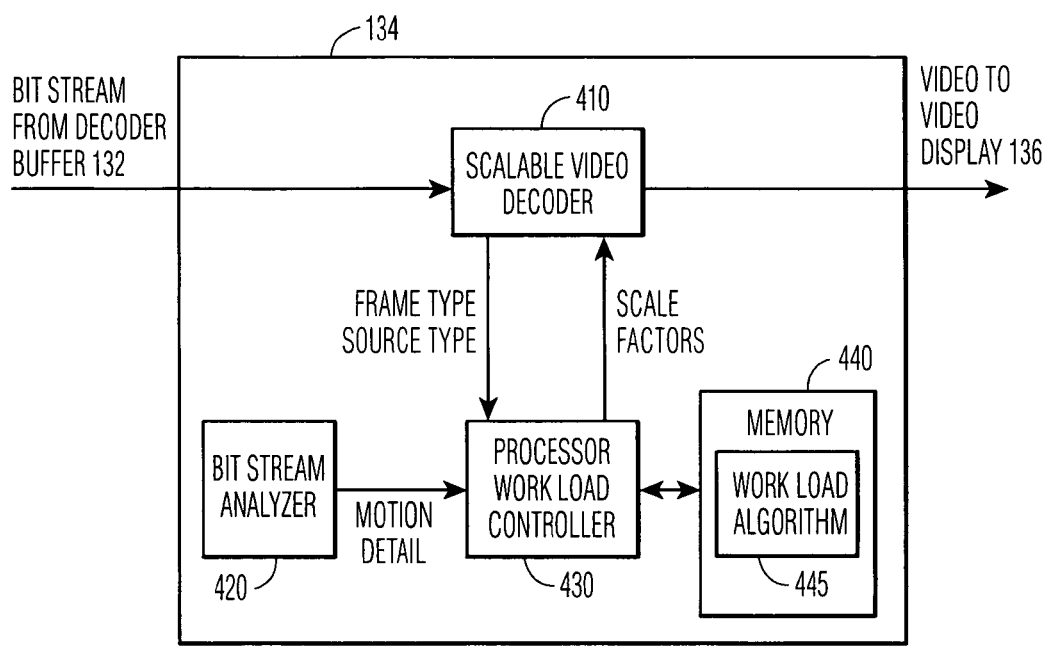
FIG. 4 illustrates a variable CPU load video decoder according to one embodiment of the present invention.

FIG. 4 illustrates variable CPU load video decoder 134 according to one embodiment of the present invention. Variable CPU load video decoder 134 comprises scalable video decoder 410, bit stream analyzer 420, processor work load controller 430, and memory 440, which stores work load algorithm 445, among other things. The different components of variable CPU load video decoder 134 may be implemented in hardware or software, or in a combination of hardware and software. For example, in one embodiment of the present invention, scalable video decoder 410 may be a software MPEG decoder executed by a data processor, and bit analyzer 420 and processor work load controller 430 may be separate routines executed by the data processor.

Bit stream analyzer 420 measures the video contents directly from the encoded bit stream and transmits data values to processor work load controller 430 indicating the instantaneous level of motion and detail in the incoming bit stream from decoder buffer 132. Based on that information, together with the current frame type (I, B, or P) and source type as indicated by scalable video decoder 410, processor work load controller 430 generates scale factors that are transmitted to scalable video decoder 410. The scale factors control the amount of decoding of the image data that scalable video decoder 410 does in order to level out peaks in the CPU workload. The strategy for translating the image characteristics (i.e., level motion, level of detail, source type) into scale factors that result in acceptable image quality is determined by work load algorithm 445. In an advantageous embodiment of the present invention, work load algorithm 445 is modifiable by the user.

Figure 5:
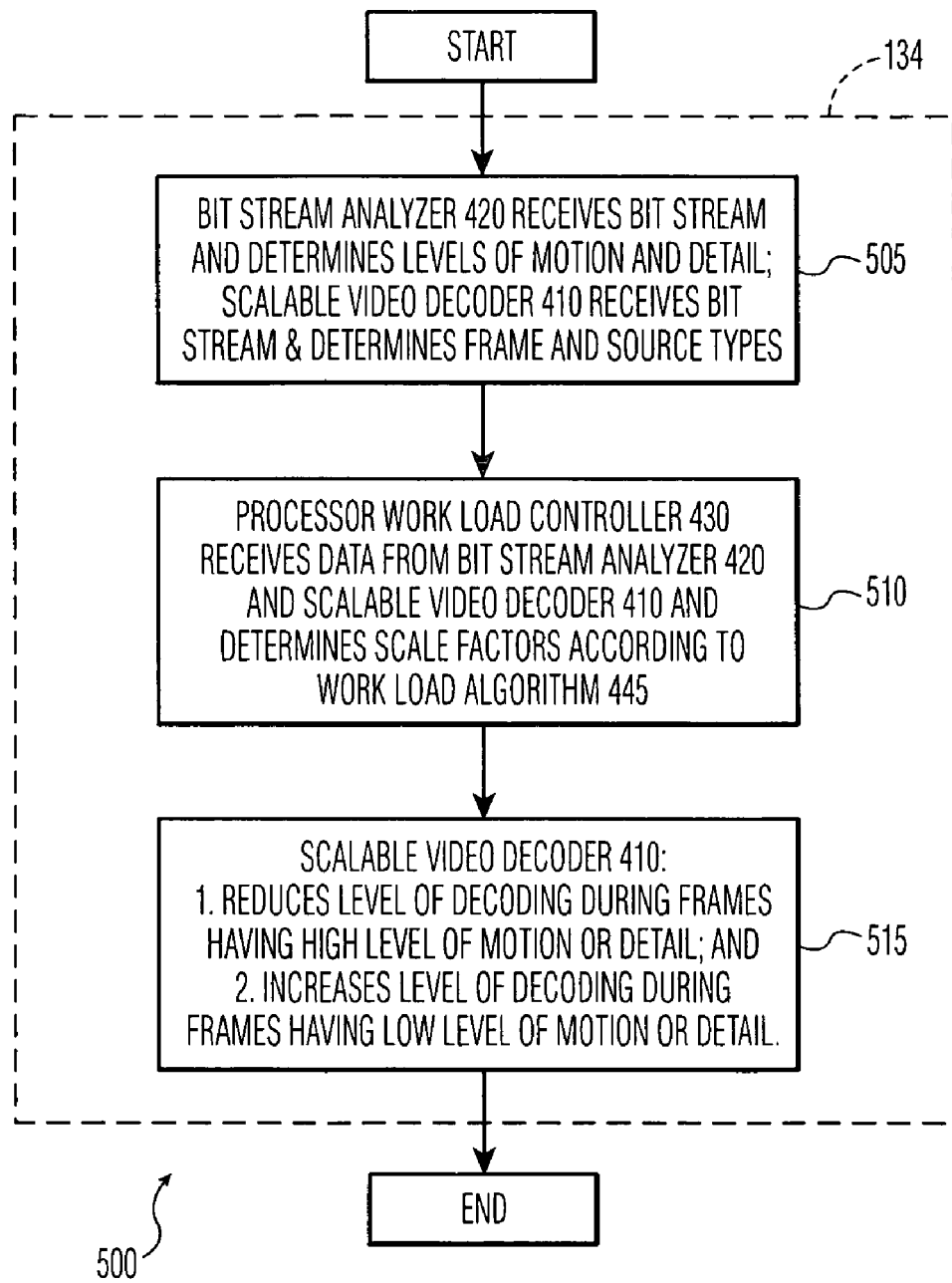
FIG. 5 is a flow diagram illustrating the operation of a variable CPU load video decoder according to one embodiment of the present invention.

FIG. 5 depicts flow diagram 500, which illustrates the operation of variable CPU load video decoder 134 according to one embodiment of the present invention. Bit stream analyzer 420 receives an incoming video bit stream from decoder buffer 132 and determine the level of motion and level of detail on a frame-by-frame basis (i.e., instantaneous). As the same time, scalable video decoder 410 receives the video bit stream and determines the frame and source types (process step 505). Next, processor work load controller 430 receives the video parameters from scalable video decoder 410 and bit stream analyzer 420 and determines scale factors for controlling the processing work load of scalable video decoder 410 according to work load algorithm 445 (process step 510). In response to the scale factors received from processor work load controller 430, scalable video controller 410 reduces the level of decoding during frames having a high level of motion and/or detail. Scalable video controller 410 also increases the level of decoding during frames having a low level of motion and/or detail (process step 515).

Although the present invention has been described in detail, those skilled in the art should understand that they can make various changes, substitutions and alterations herein without departing from the spirit and scope of the invention in its broadest form.

What is claimed is:

1. An apparatus in a receiver that is configured for receiving and decoding an incoming scalable video bit stream that has been encoded by a transmitter for transmission externally from the transmitter and further configured for generating a baseband video signal, said apparatus being configured for controlling a processing load of said scalable video decoder, said apparatus comprising:
   an analyzer circuit configured for measuring, from the received bit stream, at least one characteristic of said received bit stream and generating at least one video parameter associated with said at least on characteristic; and
   a processor load controller configured for receiving said at least one video parameter and, in response, controlling a level of decoding of said received bit stream performed by said scalable video decoder.

2. The apparatus as set forth in claim 1 wherein said at least one video parameter indicates a level of motion of frames in said incoming scalable video bit stream.

3. The apparatus as set forth in claim 1 wherein said at least one video parameter indicates a level of detail of frames in said incoming scalable video bit stream.

4. The apparatus as set forth in claim 1 wherein said processor load controller is further configured for receiving a frame type parameter associated with a first frame in said incoming scalable video bit stream.

5. The apparatus as set forth in claim 4 wherein said frame type parameter comprises at least one of an I-frame parameter, a B-frame parameter, and a P-frame parameter.

6. The apparatus as set forth in claim 5 wherein said processor load controller is further configured for receiving a source type parameter associated with said first frame in said incoming scalable video bit stream.

7. The apparatus as set forth in claim 6 wherein said source type parameter indicates whether said incoming scalable video bit stream is one of a video bit stream and a film bit stream.

8. The apparatus as set forth in claim 1 wherein said processor load controller is configured to generate at least one scale factor for controlling a level of decoding performed by said scalable video decoder.

9. A video receiver comprising:
   a buffer configured for receiving an incoming scalable video bit stream that has been transmitted externally from a video transmitter and for storing the received bit stream;
   in communicative connection with the buffer, a scalable video decoder configured for decoding the bit stream that has been stored and generating a baseband video signal, said scalable video decoder comprising:
      an apparatus configured for controlling a processing load of said scalable video decoder comprising:
         an analyzer circuit configured for measuring at least one characteristic of said bit stream that has been stored and generating at least one video parameter associated with said at least one characteristic; and
         a processor load controller configured for receiving said at least one video parameter and, in response, controlling a level of decoding performed by said scalable video decoder on said bit stream that has been stored; and
   coupled to said scalable video decoder, a display configured for displaying said baseband video signal.

10. The video receiver as set forth in claim 9 wherein said at least one video parameter indicates a level of motion of frames in said incoming scalable video bit stream.

11. The video receiver as set forth in claim 9 wherein said at least one video parameter indicates a level of detail of frames in said incoming scalable video bit stream.

12. The video receiver as set forth in claim 9 wherein said processor load controller is further configured for receiving a frame type parameter associated with a first frame in said incoming scalable video bit stream.

13. The video receiver as set forth in claim 12 wherein said frame type parameter comprises at least one of an I-frame parameter, a B-frame parameter, and a P-frame parameter.

14. The video receiver as set forth in claim 13 wherein said processor load controller is further configured for receiving a source type parameter associated with said first frame in said incoming scalable video bit stream.

15. The video receiver as set forth in claim 14 wherein said source type parameter indicates whether said incoming scalable video bit stream is one of a video bit stream and a film bit stream.

16. The video receiver as set forth in claim 9 wherein said processor load controller is configured to generate at least one scale factor for controlling a level of decoding performed by said scalable video decoder.

17. A method for controlling a processing load of a scalable video decoder incorporated within a receiver that receives an incoming scalable video bit stream from a transmitter configured for encoding to form said incoming scalable video bit stream and further configured for transmitting said incoming scalable video bit stream, said scalable video decoder being configured for decoding said incoming scalable video bit stream and generating a baseband video signal, said method comprising the steps of:
   measuring, from the received bit stream, at least one characteristic of said received bit stream;
   generating at least one video parameter associated with the at least one characteristic;
   in response to a value of the at least one video parameter, controlling a level of decoding of the received bit stream performed by the scalable video decoder.

18. The method as set forth in claim 17 wherein the at least one video parameter indicates a level of motion of frames in the incoming scalable video bit stream.

19. The method as set forth in claim 17 wherein the at least one video parameter indicates a level of detail of frames in the incoming scalable video bit stream.

20. The method as set forth in claim 17 further comprising the steps of:
   determining a frame type parameter associated with a first frame in the incoming scalable video bit stream;
   in response to a value of the at least one frame type parameter, controlling a level of decoding of the incoming scalable video bit stream performed by the scalable video decoder.

21. The method as set forth in claim 20 wherein the frame type parameter comprises at least one of an I-frame parameter, a B-frame parameter, and a P-frame parameter.

* * * * *